(12) United States Patent
Lifshitz et al.

(10) Patent No.: US 9,451,576 B2
(45) Date of Patent: Sep. 20, 2016

(54) METHODS AND SYSTEMS FOR PROVIDING LOCATION BASED ASSISTANCE VIA A MOBILE DEVICE

(75) Inventors: Gadi Lifshitz, Kiryat Ono (IL); Gilad Opher, Kibbutz (IL); Guy Ephraim, Tel Aviv (IL)

(73) Assignee: Sears Brands, L.L.C, Hoffman Estates, IL (US)

(*) Notice: Subject to any disclaimer, the term of this patent is extended or adjusted under 35 U.S.C. 154(b) by 73 days.

(21) Appl. No.: 13/364,441

(22) Filed: Feb. 2, 2012

(65) Prior Publication Data

US 2013/0203439 A1    Aug. 8, 2013

(51) Int. Cl.
| | |
|---|---|
| *H04W 24/00* | (2009.01) |
| *H04M 11/04* | (2006.01) |
| *G06Q 30/00* | (2012.01) |
| *H04W 64/00* | (2009.01) |
| *G06Q 30/02* | (2012.01) |
| *G06Q 50/00* | (2012.01) |

(52) U.S. Cl.
CPC ......... *H04W 64/00* (2013.01); *G06Q 30/0261* (2013.01); *G06Q 50/01* (2013.01)

(58) Field of Classification Search
CPC .................. G06Q 30/0613; H04W 64/00
USPC ............ 455/456.2, 404.2; 705/14.54, 14.71, 705/7.29, 14.58, 26.41, 10, 26
See application file for complete search history.

(56) References Cited

U.S. PATENT DOCUMENTS

| | | | |
|---|---|---|---|
| 7,532,899 B2 | 5/2009 | Wilson et al. | |
| 2004/0203633 A1 | 10/2004 | Knauerhase et al. | |
| 2005/0091123 A1 | 4/2005 | Freishtat et al. | |
| 2005/0251440 A1 | 11/2005 | Bednarek | |
| 2009/0061906 A1* | 3/2009 | Malik ........................ | 455/456.6 |
| 2009/0156160 A1* | 6/2009 | Evans et al. .............. | 455/404.2 |
| 2009/0216645 A1 | 8/2009 | Oleen | |
| 2009/0234700 A1* | 9/2009 | Galvin et al. ..................... | 705/9 |
| 2009/0287534 A1* | 11/2009 | Guo et al. ....................... | 705/10 |
| 2010/0036670 A1* | 2/2010 | Hill et al. ......................... | 705/1 |
| 2010/0332283 A1 | 12/2010 | Ng et al. | |
| 2011/0276382 A1 | 11/2011 | Ramchandani et al. | |
| 2012/0150598 A1* | 6/2012 | Griggs ................... | G06Q 30/06 705/14.16 |
| 2012/0203586 A1 | 8/2012 | Blakely | |
| 2012/0219144 A1 | 8/2012 | Acharya et al. | |
| 2013/0030915 A1* | 1/2013 | Statler et al. .............. | 705/14.54 |

FOREIGN PATENT DOCUMENTS

CA    2841332 A1    7/2014

OTHER PUBLICATIONS

Josh Constine "Facebook Adds Game Stories to the News Feed, Privacy Settings to Limit Them", Published Aug. 12, 2011.*
International Search Report and the Written Opinion of the International Searching Authority, or the Declaration, in International application No. PCT/US2013/023424, dated Apr. 2, 2013. (12 pages).
Extended European Search Report for Appln. No. 14 153 301.8 dated Jun. 3, 2014 (6 pages).
Canadian Intellectual Property Office correspondence dated May 31, 2016 for Examiner's Requisition for Canadian Application No. 2,841,332 dated Jul. 31, 2014, 4 pages.

* cited by examiner

*Primary Examiner* — Dung Hong
(74) *Attorney, Agent, or Firm* — McAndrews, Held & Malloy, Ltd.

(57) ABSTRACT

A method and system for providing location based assistance. The method and system including hosting a database of information regarding a customer, hosting a database of information regarding sale associate availability, and receiving a customer assistance request. The system determines the location of the customer and determines the availability of at least one sale associate within a predetermined location threshold of the location of the customer to service the customer assistance request. The customer assistance request is then routed to the at least one sale associate within the predetermined location threshold of the location of the customer for assistance.

31 Claims, 5 Drawing Sheets

METHODS AND SYSTEMS FOR PROVIDING LOCATION BASED ASSISTANCE VIA A MOBILE DEVICE

FIELD OF THE DISCLOSURE

The present description relates generally to personalized customer service, and more particularly to methods and systems for providing location based assistance via a mobile device.

BACKGROUND OF RELATED ART

In-store customer service has been previously provided by a sales associate. For instance, in a traditional situation, a customer enters a retail establishment and proceeds to browse and/or purchase items. The customer may have no preconceived notion of what they wish to buy and may utilize in-store assistance and/or advice to make a purchase. In still other situations, the customer may have an idea of the purchase they wish to make, and yet may still rely upon in-store assistance to make additional and/or other purchases based upon any number of factors including the associates recommendations, sales, advice, etc.

In a traditional on-line setting, a customer visiting an on-line store front receives little or no assistance regarding their shopping experience. Thus, in order to enhance the on-line experience, some on-line retailers have begun to provide additional enhancements to their shopping experience. For example, some websites provide customers with sales ranking, similar sales, on-line reviews, textual chats, etc. to assist an on-line customer in making purchase decisions.

In an offline environment, however, customers traditionally lack buying support other than a traditional in-store assistant. For example, in a typical retail environment, buying support may be provided by multiple actors, such as, for example, floor associates, previously researched reviews and/or product information, and other shoppers present at the same location.

In related U.S. patent application Ser. No. 13/273,459, entitled "Systems and Methods For Providing A Distributed Mobile Call Center For A Service Establishment," filed Oct. 14, 2011, and incorporated herein by reference in its entirety, the inventor describes a system that provides a mobile application service call including service calls to associates within the retail/service establishment. In the disclosure the inventors provide for a system and method that is particularly well suited to a mobile application and that provide the ability for a customer to initiate a mobile video call to receive expert assistance as needed.

While the background systems and methods identified herein, generally work for their intended purpose, the subject invention provides improvements thereto, particularly by providing a customer with a mobile application that enables a customer to find and communicate with various types of people such as sales associates, social connections, etc., in real time or near real time based upon a customer location and/or a identification of what the customer is looking for.

BRIEF DESCRIPTION OF THE DRAWINGS

For a better understanding of the present disclosure, reference may be had to various examples shown in the attached drawings.

DETAILED DESCRIPTION

The following description of example methods and apparatus is not intended to limit the scope of the description to the precise form or forms detailed herein. Instead the following description is intended to be illustrative so that others may follow its teachings.

A mobile assistance application is explained hereinbelow. In general, the application identifies a customer location and allows the customer to share and/or specify product purchase needs/wants to receive assistance regarding their purchases. The customer location may be used for ecommerce, social media, retail, multichannel retail, mobile, and tablet enhancements as well as the gamification of a customer experience (e.g., funware). In one example, the application enables a customer to find and communicate with a sales associate based upon the customer location and/or purchase intentions. The system allows a one-to-one, one-to-many, and/or a many-to-many communication scheme. The sales associate may be an expert, question and answer provider, merchandise associate, etc. Still further, in another example, the application identifies a customer location and allows a third-party such as a sales associate, to proactively contact the application and thus provide further assistance to the customer. In each example, the assistance provided may be personalized to meet the customer's needs, such as for instance, personalized recommendations based upon information gleamed from rewards programs, search history, purchase history, social media interactions, friends' transactions, social coupons, shared coupons, likes, dislikes, and/or other personal data. The present mobile assistance application provides additional customer service options as long as the customer has access to a mobile device.

In one example, the system provides the use of commodity hardware, off the shelf software, OS independent applications, form factor independent devices (PC, tablets, smart phones etc), media independent (voice, text, video) and cloud based infrastructure to run all functionalities of the present system. In the context of a service establishment, such as, for example, a retail store this is specifically very useful as a customer can utilize familiar technologies and receive relate and personalized support, assistance, product demos, suggestions, etc., which can be handled by a sales floor associate who has the most expertise and relevant information and who are located proximate to the customer, and/or can be handled by the consumer's social network.

The disclosed methods and systems may be part of an overall shopping experience system created to enhance the consumer shopping event. In one example, the disclosed system is integrated with the customer's reward system, the customer's social network (e.g., the customer can post their shopping activity conducted through the system to their social network), the customer's expert system, digital/mobile applications, shopping history, wish list, location, merchandise selections, or the like. It will be appreciated, however, by one of ordinary skill in the art that the system disclosed may be fully and/or partially integrated with any suitable shopping system as desired, including those not mentioned and/or later designed.

With reference to the figures, the following discloses various example systems and methods for providing in-store assistance and/or social network shopping on a computer network, such as a mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., to access a host system server 68 and, among other things, be connected to a hosted social networking site, a user profile, and/or a sales associate. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

Figure 1:
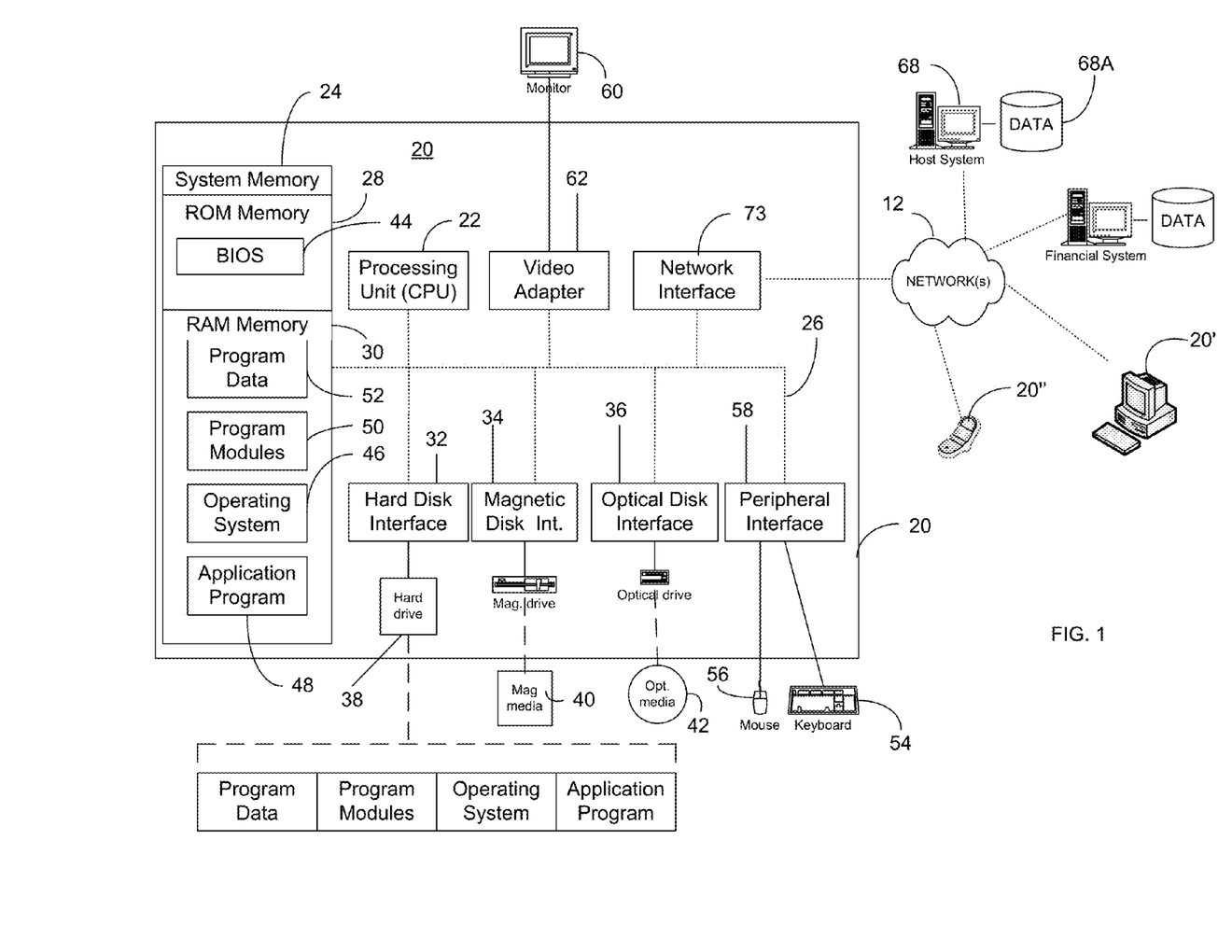
FIG. 1 illustrates in block diagram form components of an example, computer network environment suitable for implementing the example service call systems disclosed.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, coordinating a social network storage of a shopping list, receiving a location of a customer via a mobile device, receiving a request for a service call center connection from either a customer or a sales associate, routing the request via a distributed mobile video call center, providing a service call infrastructure for providing the requestor with a distributed customer service experience, Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2A:
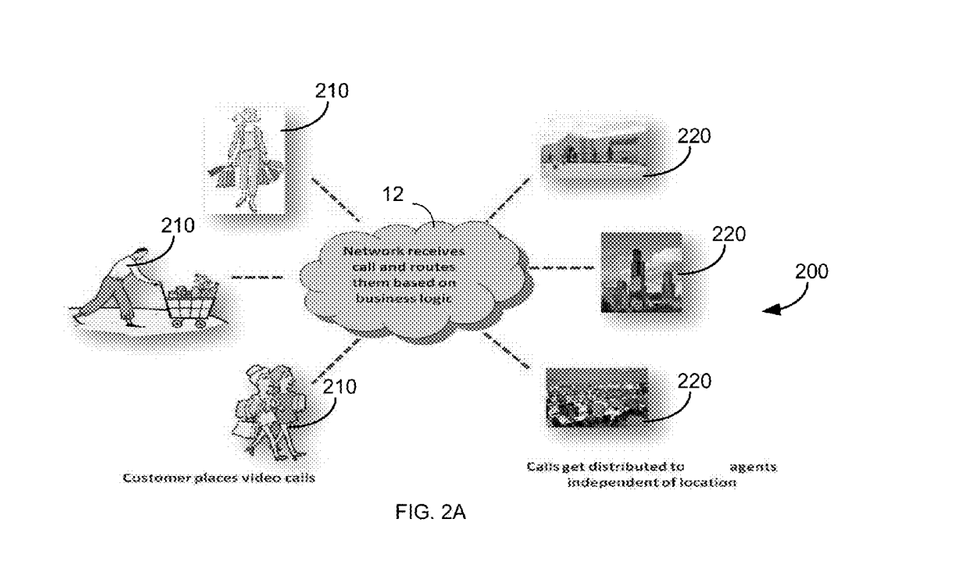
FIG. 2A illustrates an example service call system in accordance with the present disclosure.

Referring to FIG. 2A, there is illustrated an overview of an example call center distribution system 200 in accordance with an example of the present disclosure. The system 200 is well-suited for operation on a distributed network system, such as, for example, the Internet, cloud, mobile network, cellular network, or other suitable wired and/or wireless network. The system 200 may be implemented in various other communication networks and/or mediums as desired including, for example, a localized, non-distributed network.

Generally speaking, the system 200 is operable to facilitate a distributed service call between a customer and a service agent independent of the service agents physical connection with a traditional call center. For instance, in the illustrated example, a customer 210 (e.g., a user, consumer, shopper, etc.), having need of customer assistance, places a phone call, such as a video phone call, to a customer service server (e.g., the host server 68) through any suitable network such as the network 12. In this example, the network 12 is coupled to the host server 68 to distribute the call to one of a plurality of customer service agents 220 geographically distributed in independent locations.

In this example, the distributed customer service agent 220 can be any individual with access to a service center call device, such as a mobile service center call device. The agent may be located locally to the call initiator, or may be located anywhere remotely in the agent network. For example, the agent may be located in the same service establishment (e.g., retail sale) location as the caller, or may be at another sales location, such as an outlet, service department, call center, etc.

Figure 2B:
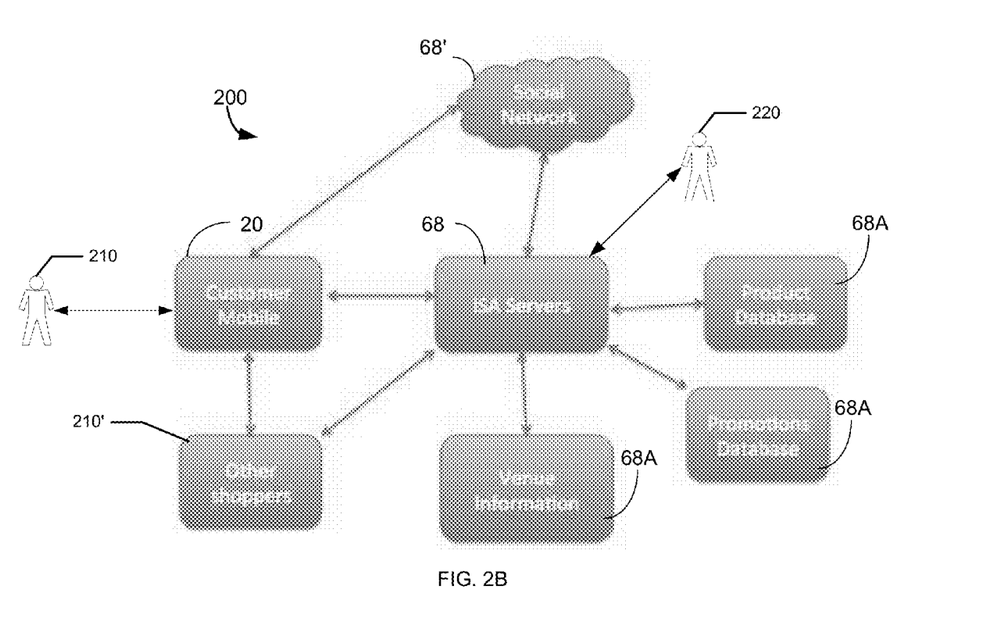
FIG. 2B illustrates an example system for providing in-store assistance via a mobile device.

Turning now to FIG. 2B, there is illustrated another example use of the distributed system 200 as described above. In this example, the system 200 creates a connection between the customer 210 and the customer service agent 220, between the customer 210 and another shopper 210', or between the customer 210 and the customer's social network. For example, in one instance, the customer 210 may provide the host system 12 with the customer's current location. This may be done through an automated means (e.g., automatic network location and/or GPS location, etc) or may be done manually through a "check-in" service. In an example "check-in" service, a user may proactively provide the server 68 with their location through any suitable means. This may be through the use of a specific button, service, and/or other suitable check-in on provided with the system 200 including an application specific check-in button on a mobile application provided with the device 20. The check-in may also occur through other means including scanning of specific codes, textual messages, emails, etc.

Once the customer 210 has registered their location with the server 68, data relevant to the location and the shopping purpose may be utilized and/or otherwise provided to the sales associate 220. In this example, the server 68 may utilize data from a social network 68', which may be an external social network, or may be an internal social network provided by the host system 68. The server may also utilize data regarding location and/or enterprise specific products inventory, new inventory, etc, data regarding promotions, and/or data regarding promotions, sales, etc, each of which may be stored in the data repository 68A. By utilizing data from any number of data repositories, the system 200 may present the sales associate with relevant data, thereby increasing the likelihood that the customer 210 will receive sufficient service.

Of course, it will be appreciated by one of ordinary skill in the art that the customer 210 may elect to provide as little or as much personal information as desired. For example, the customer 210 may elect to allow the system 200 to retrieve their current location, but may reject a request to receive data from the social network 68'. In at least one example, the customer 210 may be rewarded with various rewards including additional promotions, loyalty rewards, etc. Additionally, the customer's location and/or shopping intentions/purchases may be posted online in a social network setting, assuming the customer's privacy allows for such information to be provided.

By coordinating data exchanges between the host server 68 and the sales associate 220, the system 200 allows for the customer 210 to announce and/or other indicate their specific purchase intents in order to receiver support either from their online (e.g., social network) community, or from the sales associate 220 (in-store, centrally located, etc). The system 200 may then provide the customer 210 with notifications (vie email, video, text messages, etc) as soon as inventory matching their purchase intents are available at the customer's local locations, or can be obtained through distribution channels, regardless of the currently location of the customer 210. In this way, the sales associate may be able to monitor and/or otherwise service the customer 210 even if the customer is not in the physical retail establishment. Additionally, by understanding the customer's current location and allowing the customer 210 to check-in, the sales associate 220 and/or the system 200 may provide (e.g. push) the customer 210 with a summary of interesting and/or new inventory, advertisements, specials, deals, coupons, etc., the moment the customer 210 arrives and/or checks-in at the retail location. The system 200 may utilize the customer's past favorites, current needs/wants, purchase history, etc available for use by the sales associate 220 to provide a personalized customer experience.

Additionally, in one example, once the host server 68 is notified of the customer's location and/or check-in status, the system 200 may initiate a call and/or other communication network utilizing the mobile distribution process described below. As noted above, during initiation of the customer call, the system 200 may utilize the customer's purchasing history, intentions, etc. to identify the proper sales associate. If the sales associate 220 is available, the interaction between the associate 220 and the customer 210 may be completed through text, voice, and/or video chat as noted. The communication between the associate 220 and the customer 210 system 200 may be sales associate or customer initiated.

As described below, as a customer 210 indicates their presence in a retail environment through the mobile application, the system 200 will identify a customer service agent that can assist the customer. The customer service agent is preferably located within the same retail environment as the customer, but the associate may be alternatively located anywhere within the customer care network. For the point of view of the sales associate, the associate may watch and/or otherwise monitor the system 200 to ensure that any customer 210 waiting for assistance, browsing on-line and/or in the store, asking for service, etc., is properly tended to. In the situation where the customer is identified as requiring assistance, and yet no local sales associate is available, the system 200 will route the call to a properly staffed service center to ensure the customer is serviced.

Figure 3:
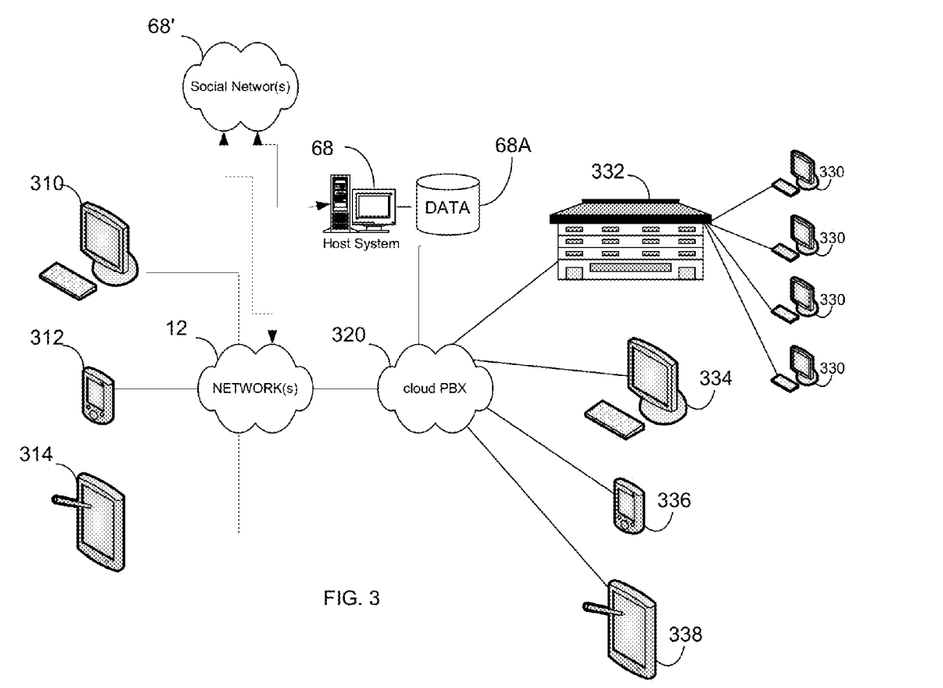
FIG. 3 illustrates a wire diagram of an example system for a service call system and a location based assistance in accordance with the present disclosure.

As illustrated in more detail in FIG. 3, in this example, the customer 210 remotely initiates a customer service call through any suitable device, such as a computer system 310, a smart phone 312, a tablet computer 314, or any other suitable known or yet to be developed communication device. In the disclosed example, the communication device is capable of video transmission (e.g., video chat, video phone, etc), but it will be appreciated by one of ordinary skill in the art that the communication device may be any suitable communication device including any voice and/or text communicator without use of video transmission. Once the service call is initiated, the call is routed through the network 12 to the host server 68. In this example, routing of the service call utilizes a cloud based private branch exchange (PBX) 320, although any appropriate routing device (software, firmware, hardware, and/or the like) may be utilized. The service call is then routed to the best available customer service associate based on a predetermined business logic, one example of which will be described below. The available customer service agent may include one of a plurality of centralized associates located at terminals 330 associated with a traditional call center 332, or a distributed associate located at a personal computer 334, a smart phone 336, a tablet computer 338, or any other device.

The illustrated call center approach may take advantage of the convergence of mobile devices, IP telephony (e.g., VoIP, SIP, etc) and Internet application such as, for example, Facetime, Skype, etc. The example call center system may also enable interactive communications amongst customer service agents, customers, retail associates and partners, etc, across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

Figure 4:
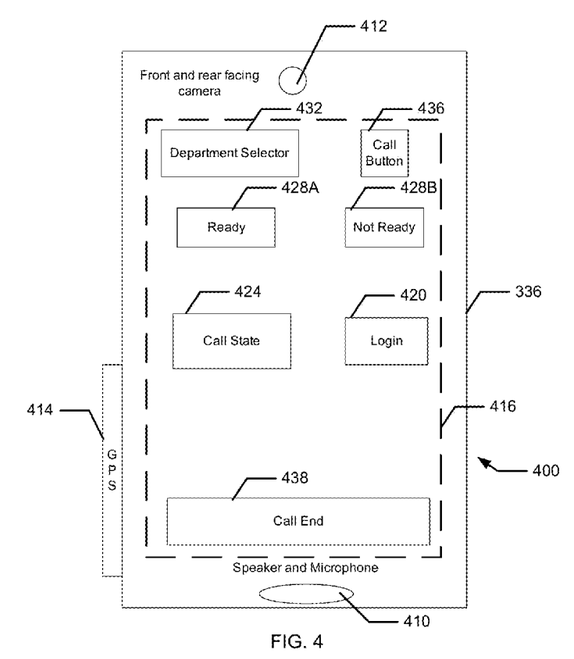
FIG. 4 illustrates an example user interface for implementing an example service call system in accordance with the present disclosure.

Turning to FIGS. 4, 5A-5C, and 6, there is illustrated one example user interface including user interface elements for conducting a service call in accordance with the teachings of the present disclosure. For instance, FIG. 4 illustrates an example user interface 400 shown in schematic form. In the illustrated example, the user interface 400 may be displayed on a communication device, such as the smart phone 336. The example smart phone 336 includes speaker and microphone 410, a camera 412 (e.g., a front and/or rear facing camera), and an external and/or internal location device 414, such as a global positioning system or other positioning system such as a cellular network positioning system, indoor positioning system (e.g., RFID, Bluetooth, Wi-Fi access, etc.). The smart phone 336 also includes a display 416 capable of displaying user interface elements to a user, and in this example, capable of receiving physical stimulations (e.g., touch) which may be interpreted by the smart phone 336 as input into the device. It is to be understood that the illustrated device is merely representative of one possible device capable of conducting a service center call and that other devices user interfaces, applications, and/or components may be used and/or omitted as desired.

In the examples illustrated in FIGS. 4 and 5A-5C, the user interface 400 include user interface elements representative of one user interface that could be utilized by a customer service agent. In this example, the user interface 400 includes a plurality of selectable elements on the display 416. For instance, the user interface 400 includes a log-in/log-out selectable element 420, a call status selectable element 424, at least one agent status selectable element 428, a department (e.g. category) selectable element 432, a call initiator selectable element 436 and/or a call terminator selectable element 438. It will be understood that the user interface may eliminate or include additional elements as desired. Additionally, while some elements are illustrated as separate and/or combined elements, one of ordinary skill in the art will appreciate that the elements may be combined and/or separated as desired.

Figures 5A, 5B:
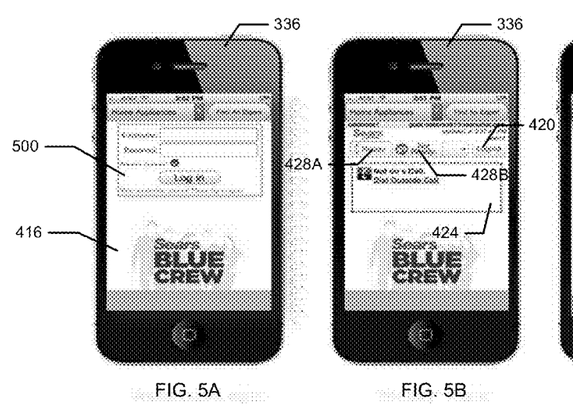
FIGS. 5A-5C together illustrate an example user interface for registering an agent with the example service call system in accordance with the present disclosure.
Figure 5C:
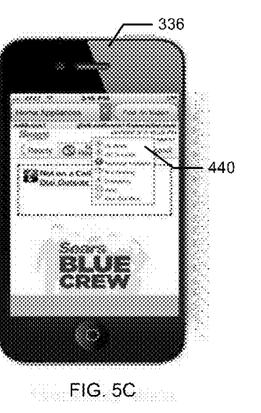

As shown in FIG. 5A, when the log-in/log-out selectable element 420 is selected (e.g., the element 420 is in a log-in mode), the user interface 400 displays a log-in element 500 which prompt the agent to log-in to the host server 68 to register the agent with the host server 68 and allow the agent to be eligible to receive service calls. If the agent is already logged-in to the host server 68, the element 420 will be in a log-out mode, allowing the agent to select the element 420 and de-authorize the agent from the host server 68. Although illustrated as a username and password combination in FIG. 5A, The log-in element 500 may be any suitable registration interface including, for example, a PIN, a swipe pattern, a biometric password, a user id and password combination, and/or any other authorization scheme. Additionally, the log-in requirement(s) may be secure, and/or unsecure as desired. As noted above, once the agent log-in is successful, the log-in/log-out element 420 may be updated to be in a log-out mode, allowing the agent to log-out from the host server 68 as desired.

Once the agent is logged-in, or otherwise registered with the host server 68, the agent may be presented with a plurality of user interface elements as described above, and as illustrated in FIGS. 4 and 5B-5C. For instance, the user interface may include the agent status selectable element 428 which in this example includes a uniquely selectable "Ready" and "Not Ready" portion 428A and 428B, respectively. In this instance, the agent can select the "Ready" portion 428A to indicate to the host server 68 that the agent is available to receive service calls. If, however, the agent is busy and unable to accept calls, the agent may select the "Not Ready" portion 428B of the element 428, to indicate to the host server 68 that the host server 68 should not connect any service calls to the agent. In the example illustrated in FIG. 5C, the "Not Ready" portion 428B may include a plurality of selectable elements 440 indicating a reason for the unavailability of the agent. In this instance, by selecting a reason for unavailability, the host server 68 may utilize the information in any suitable manner, including agent performance evaluations, program evaluations, optimization of business logic, statistical analysis, and/or modification of the business logic processing, or any other suitable manner.

In addition to the identified elements, the user interface 400 may include the call state element 424 best illustrated in FIG. 5B. The call state element 424 displays the status of any currently conducted service call. For instance, as illustrated, the call state element 424 provides the agent with a visual indication that the agent is not currently on a service call. It will be understood that the call state element 424 may provide the agent with any suitable information and/or processing choices, including the ability to dial an outside line, etc. The agent may terminate a service call by selecting the call terminator selectable element 438 as is known. It will be understood that the service call may be conducted in video mode, and thus the video call may be displayed on any suitable portion of the display 416, and may utilize the camera 412 as appropriate.

Figure 6:
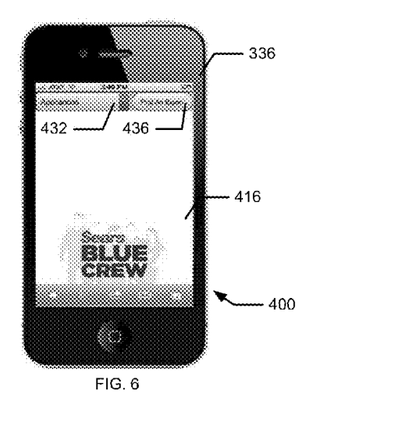
FIG. 6 illustrates an example user interface for placing a service center call request with the example service call system in accordance with the present disclosure.

Turning to FIG. 6, there is illustrated an example user interface 400 that may be provided to the user 210 seeking to establish a service call with an agent 220. In this example, the user interface 400 includes the display 416 for conducting a video service call, the department selectable element 432, and the call initiator selectable element 436. In this example, the department selectable element 432 includes the ability for the user to select the area of expertise that the user is looking to receive help on. For instance, the user may select appliances, electronics, bedding, or any other category. It will be appreciated that the department selectable element 432 may be eliminated as desired and the service call may be generally connected and routed through any desired means, including automatic call distributor (ACD), Interactive voice response (IVR) routing, etc. The user may select the call initiator element 436 to connect to a service agent registered with the host server 68.

In one example, a user can start a service call with an agent by announcing their location (either automatically and/or manually), by "checking-in" to a particular location, scanning an identifying code, such as for example, a bar code, a two-dimensional bar code (e.g., a QR Code, etc.), or other similar identifying code. Alternatively, the user may initiate a service call through a voice, text, and/or video call application, and/or may further initiate a call through a mobile website. The initiation of the service call may be tied to a generic number/address/code, or may be specialized to a product, department, location, etc. For example, the user can scan a generic two-dimensional bar code such as a QR Code, wherein the QR Code initiates the user interface 400 for assisting in connecting the user with the current service call agent. As noted above, the user interface 400 may provide various department and/or other selectable identifying elements to assist in directing the user to the correct service call agent. Still further, if a more specific means of initiating the call is performed (e.g., a specialized code, SKU number, QR code, etc.), the code may be resolved by the user interface 400, the host server 68, and/or any other element of the system to ensure the call gets routed accordingly.

In one example, a user in a retail location wishes to receive a customer service call directed toward a retail item such as a table saw. The user can initiate a service center call through their mobile device by scanning a code, or by calling a telephone number. The user's call is routed to an agent with saw expertise to discuss the purchase of a table saw to ensure the user gets the correct product. The saw can be demonstrated live to the user (if video equipped) and key features may be highlighted for the user's benefit. The user and service call agent may be located in the same retail location, or may be located in separate (e.g., remote) locations as necessary. Still further, the user's and/or the agent's location may be identified through the use of the location device 414, allowing the user and/or agent to recommend additional services based upon their location, to find each other if in the same general vicinity (even within the same retail location, such as, for example, through internal store based location services), and/or to identify additional location based specials, services, coupons, etc. The user and/or agent may be able to utilize external and/or internal mapping services to direct and/or to be directed to additional items of interest, etc.

In another example, a user attempting to purchase an item may initiate a service call due to a sizing and/or color question. Again, the user initiates that call through any suitable means, and is connected to a service agent. A customer service agent may be able to exchange videos, and hold a conversation with the shopper from a remote location and provide advice on the size, color, shipping options, sales, etc., all while the user is looking at the merchandise in the retail location. The service agent may recommend additional color selections and/or sizes available at other location close to the user (via location services), may suggest coordinating items, arrange for delivery of the item that is out of stock, etc.

In still another example, a user can initiate a call regarding an item that may be in need of repair, such as for example, an appliance in the user's home. The user can initiate the service call and provide the service agent with a visual picture of the offending part that may be in need of repair. By being able to visually see the item the service agent may be able to identify the right part, provide warranty and/or service information, and/or schedule a repair service call.

In still another example, a user may shop at home and/or other location outside of the retail location and may call to inquire about a sale item, an item for retail purchase, and/or an outlet item. For example, a user may see an advertisement including a QR Code for more information regarding an item for sale. Alternatively, the user may be contacted directly by the sales associate based upon a customer profile gleaned from the customer's past interaction with the retail locating and/or based upon social media posting/content. In any event, the call may be connected to a service agent at the location of the item (e.g., a sales associate at the retail location) where the agent may be able to provide visual information and/or a description of the item for use by the user to determine whether they wish to buy the item. The service agent may complete the sale while the user is on the service call, and may have the item delivered and/or have the item waiting for the user for immediate impact, thereby streamlining the purchasing process, and in some instances, proactively making a sale.

Finally, as described above, the customer may be connected to a sales associate in order to receive support regarding an item the customer is looking for, may be connected to the customer's friend, or may be connected to other shoppers present at the same location. The system 200 enables a customer to find and communicate with various types of people in real or near real-time based on the customer's location or based on the customer's needs/wants. The system 200 is also provided with the capability to utilize data from various system resources, including shopping lists, online activity, shopper history, rewards history, wishlists, sizing data, etc. to receive and/or request specific purchasing support.

Figure 7:
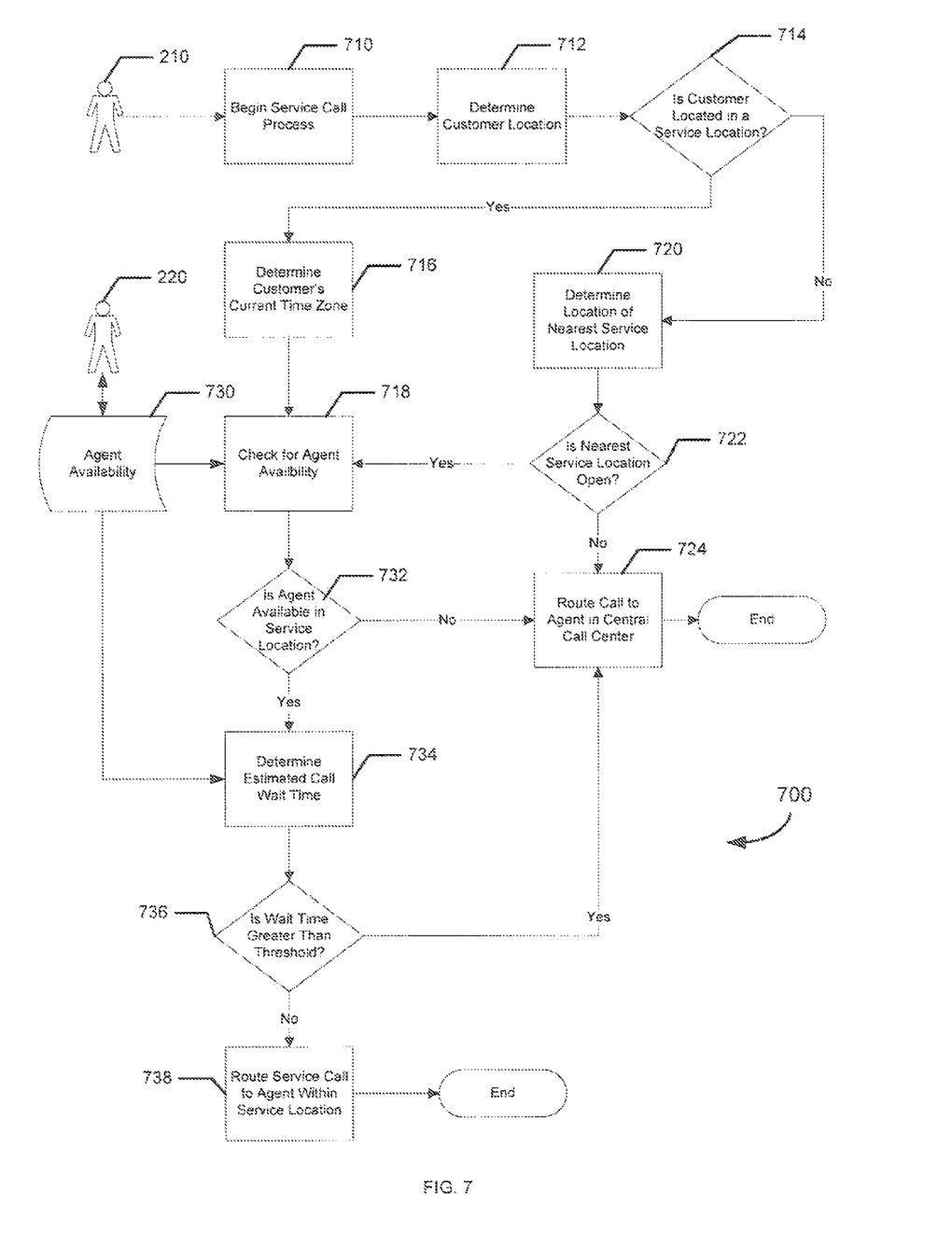
FIG. 7 illustrates a detailed flowchart of an example method and system for processing a service center call request in accordance with the present disclosure.

Referring to FIG. 7, there is illustrated a flowchart of an example service center process 700 that may be implemented on a computer system and/or provided on a non-transitory computer-readable medium to implement the connection portion of the system described herein. While in the described example, a retail location is described, it will be appreciated that the disclosed processes and systems may be implemented in any suitable environment, including, for example, any service location, or other environment where a service call may be placed.

In the example of FIG. 7, the process 700 begins at block 710 when a customer initiates a service center call. As previously noted, the call may be initiated through the identification of the user's location, a "check-in" request, the scanning of an identifying code, such as for example a QR Code, through a application such as a website and/or communication application and/or may be initiated with a traditional phone call. At block 712, the customer's location may be determined through any available means, including, for instance, through global positioning (GPS), cellular network location identification, radio frequency identification (RFID), Bluetooth, wireless network identification (Wi-Fi), unique identifier in the scanned identification code, zip code, interactive voice response, Dual Tone Multiple Frequencies (DTMF) tones, or any other suitable location determination process.

Upon determination of the customer's location, the process 700 determines whether the customer is located within a service location, such as for example a retail location, or at least within a suitable distance threshold to be considered at the service location at block 714. The process of determining whether the customer is in a specific service location may be determine through any suitable determination process, including a comparison between the determined location and a listing of known service locations, a determination whether the customer is on an identifiable network, or other determination process.

If the customer is located within or sufficiently near a service location, the process 700 may determine the customer's current time and/or time zone at block 716 and check for agent availability at block 718. If, however, the process 700 determines that the customer is not located at a service location, such as for instance a retail establishment, the process will determine the location of the nearest service location at a block 720. Because the customer may be near multiple service locations, and/or because the customer may have a preference for a particular service location, the process 700 may query the customer and allow the customer the ability to choose from multiple location options. At block 722, the process 700 may determine whether the desired location is open for business, and if so, process with continue at block 718 by checking for agent availability. Otherwise, if no location is open for business, the call will be processed at block 724 by routing the call to an agent in a centralized call center.

In checking for agent availability at block 718, the process 700 may rely upon a listing of agent availability 730. The agent availability 730 may be, for example, an electronic record of data stored in the data repository 68A. In this example, the agent availability 730 is populated by agents utilizing the user interface previously described in connection with FIGS. 4 and 5A-5C. Relying upon the agent availability data, at block 732, the process 700 determines whether there is an agent available in the same service location as the customer. In this example, if there is not an available agent, process continues with block 724, where the call is routed to an agent in the centralized call center If, however, the process 700 determines that there is an agent available at the customer's service location, at block 734 the process 700 may determine the estimated call wait time utilizing agent availability 730 and/or any other statistical analysis. At block 736, the process 700 may determine whether the estimated wait time is greater than an acceptable threshold, and if so, route the call to an agent in a central call center at block 724. As will be appreciated by one of ordinary skill in the art, routing calls through a central call center may be performed utilizing any suitably known or yet to be developed call center distribution technology. It will be also be appreciated that a customer may identify a "favorite" agent, and if the favorite agent is determined to be unavailable, the customer may leave a message requesting a return call, etc.

If the process determines the wait time is within sufficient parameters for a successful service center call, the call may be routed to an agent within the service location at block 738. The service call may be conducted as desired, and may also include various identifying information including the customer location, the item of interest, any memberships and/or VIP status, etc. In this way, the agent may best be able to service the local customer's concerns and/or questions. It will further be understood that in various other examples, the call may not be routed directly to an agent in the customer's service location, but rather may be directed to an expert at another location (e.g., at another service location or at a central call center) as desired. For example, if an agent in another service location has particular expertise in a certain product, the process 700 may route the customer directly to the expert as necessary. In this way, the agent availability 730 may include predetermined logic to rank and/or identify agent characteristics and expertise to best route the customer through the service call experience.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transitory computer-readable media having stored thereon computer executable instructions, wherein the instructions perform steps of a method of operating a system for providing location based assistance via a computing device, the steps comprising:

hosting a database of personal information regarding a customer of a merchant, the personal information enabling communication, by a system of the merchant to members of an online social network of the customer, according to privacy information set by the customer;

hosting a database of information regarding current availability of sales associates of the merchant;

hosting a database of current product inventory information that identifies a merchant location of each product item in the inventory of the merchant;

receiving a current location of the customer and a request from the customer for assistance regarding a particular product item;

posting notice of shopping activities of the customer to the members of the online social network of the customer, according to the privacy information;

in response to receiving the request for assistance from the customer:

determining whether at least one sales associate, at a location of the merchant at which the particular product item is in stock and available for purchase, is available to interact with the customer, based on the information regarding current sales associate availability, and the current product inventory information, establishing call communication between the customer and one of the at least one available sales associate at a location of the merchant at which the particular product is in stock and available for purchase, based on the information regarding current sale associate availability, the current product inventory information, and the current location of the customer, if it is determined that at least one sale associate at a location at which the particular product item is in stock and available for purchase, is available to interact with the customer, and establishing call communication between the customer and a designated location of the merchant, based on the information regarding current sale associate availability, the current product inventory information, and the current location of the customer, if it is determined that at least one sale associate at a location at which the particular product item is in stock and available for purchase, is not available to interact with the customer, or if it is determined that the particular product item is not available at any location of the merchant; and providing access to information representative of customer purchase history, wherein the inventory information is determined based upon a comparison of the inventory information and the purchase history.

2. The non-transitory computer-readable media as defined in claim 1, wherein receiving the current location of the customer comprises receiving an identification of the customer location from the computing device.

3. The non-transitory computer-readable media as defined in claim 2, wherein the location of the customer is identified through a customer provided location.

4. The non-transitory computer-readable media as defined in claim 1, wherein the location of the customer is within a retail establishment.

5. The non-transitory computer-readable media as defined in claim 4, wherein the at least one sales associate is located within a same retail establishment as the customer.

6. The non-transitory computer-readable media as defined in claim 1, wherein determining the availability of the at least one sales associate comprises determining availability of at least one sales associate closest to the location of the customer and within a predetermined location threshold of the location of the customer.

7. The non-transitory computer-readable media as defined in claim 6, comprising providing information regarding the customer to the available at least one sales associate closest to the location of the customer.

8. The non-transitory computer-readable media as defined in claim 1, wherein the instructions perform steps for providing location based assistance via a computing device, comprising:
  determining relevant inventory information from the information regarding inventory based on the information regarding the customer, and
  providing the relevant inventory information to the available at least one sale associate.

9. The non-transitory computer-readable media as defined in claim 1, wherein the instructions perform steps for providing location based assistance via a computing device, comprising:
  communicating, by the available at least one sales associate, promotional information to the customer in response to receiving the current location of the customer.

10. The non-transitory computer-readable media as defined in claim 1, wherein receiving the current location of the customer comprises receiving one or more of global positioning system data, network utilization data, and indoor positioning data.

11. The non-transitory computer-readable media as defined in claim 1, wherein the instructions perform steps for providing location based assistance via a computing device, comprising:
  providing a user interface comprising user interface elements to allow the customer to originate a communication with customer assistance request.

12. The non-transitory computer-readable media as defined in claim 1, wherein the instructions perform steps for providing location based assistance via a computing device, comprising:
  providing a user interface comprising user interface elements to allow the available at least one sales associate to originate a communication with the customer.

13. The non-transitory computer-readable media as defined in claim 1, wherein in response to a customer assistance request received from the customer, the customer is provided with inventory information.

14. The non-transitory computer-readable media as defined in claim 13, wherein the inventory information comprises one or more of new inventory, sale inventory, clearance inventory, and promotion inventory.

15. The non-transitory computer-readable media as defined in claim 13, wherein the inventory information is personalized based upon the information regarding the customer.

16. The non-transitory computer-readable media as defined in claim 1, comprising providing a user interface on a mobile device.

17. The non-transitory computer-readable media as defined in claim 1, wherein the information regarding the customer comprises social media information.

18. The non-transitory computer-readable media as defined in claim 1, wherein the information regarding the customer comprises purchase intent.

19. The non-transitory computer-readable media as defined in claim 1, comprising:
  providing access to social media information regarding the customer, wherein the inventory information is determined based upon a comparison of the inventory information and the social media information; or
  providing access to information representative of customer purchase intent, wherein the inventory information is determined based upon a comparison of the inventory information and the purchase intent.

20. A non-transitory computer-readable media having stored thereon computer executable instructions, wherein the instructions perform steps of a method of operating a system for providing customer assistance via a computing device, the steps comprising:
  hosting a database of product inventory information comprising merchant locations at which each product item is currently in stock and available for purchase;
  receiving a customer call requesting assistance regarding a particular product item;
  posting notice of shopping activities of the customer to members of an online social network of the customer, according to privacy information set by the customer;
  in response to receiving the customer call requesting assistance:
    determining whether at least one sales associate is available at a location at which the particular product item is currently in stock and available for purchase, and
    establishing call communication between the customer and an available sales associate at a merchant location at which the particular product item is currently in stock and available for purchase, based on information regarding current sales associate availability and the current product inventory information, if it is determined that at least one sales associate is available at a merchant location at which the particular product item is currently in stock and available for purchase; and providing access to information representative of customer purchase history, wherein the inventory information is determined based upon a comparison of the inventory information and the purchase history.

21. The non-transitory computer-readable media as defined in claim 20, wherein the instructions perform steps for providing customer assistance via a computing device, comprising:
   determining the location of the customer; and
   wherein determining the location of the customer comprises receiving an identification of the customer location from the computing device.

22. The non-transitory computer-readable media as defined in claim 21, wherein the location of the customer is identified through a customer provided location.

23. The non-transitory computer-readable media as defined in claim 21, wherein determining the location of the customer includes one or more of utilizing global positioning system data, utilizing network utilization data, and utilizing indoor positioning data.

24. The non-transitory computer-readable media as defined in claim 20, wherein the instructions perform steps for providing customer assistance via a computing device, comprising:
   providing the inventory information to the customer when the customer is located within a predetermined location, wherein the predetermined location is a retail establishment.

25. The non-transitory computer-readable media as defined in claim 20, wherein the instructions perform steps for providing customer assistance via a computing device, comprising:
   providing inventory information that includes one or more of video, text, and voice communication to the customer from a merchant location at which the particular product item is in stock and available for purchase.

26. The non-transitory computer-readable media as defined in claim 20, comprising a user interface having user interface elements to allow the customer to originate a customer assistance request.

27. The non-transitory computer-readable media as defined in claim 20, comprising a user interface having user interface elements to allow a sales associate to originate a customer assistance request.

28. The non-transitory computer-readable media as defined in claim 20, wherein the inventory information is personalized based upon hosted information regarding the customer.

29. The non-transitory computer-readable media as defined in claim 20, wherein the inventory information is provided on a mobile device.

30. A non-transitory computer-readable media having stored thereon computer executable instructions, wherein the instructions perform steps of a method of operating a system for providing customer assistance via a computing device, the steps comprising:
   hosting a database of product inventory information comprising merchant locations at which each product item is currently in stock and available for purchase;
   receiving a customer call requesting assistance regarding a particular product item;
   posting notice of shopping activities of the customer to members of an online social network of the customer, according to privacy information set by the customer;
   in response to receiving the customer call requesting assistance:
      determining whether at least one sales associate is available at a location at which the particular product item is currently in stock and available for purchase, and
      establishing call communication between the customer and an available sales associate at a merchant location at which the particular product item is currently in stock and available for purchase, based on information regarding current sales associate availability and the current product inventory information, if it is determined that at least one sales associate is available at a merchant location at which the particular product item is currently in stock and available for purchase; and
   providing access to social media information regarding the customer, wherein the inventory information is determined based upon a comparison of the inventory information and the social media information.

31. A non-transitory computer-readable media having stored thereon computer executable instructions, wherein the instructions perform steps of a method of operating a system for providing customer assistance via a computing device, the steps comprising:
   hosting a database of product inventory information comprising merchant locations at which each product item is currently in stock and available for purchase;
   receiving a customer call requesting assistance regarding a particular product item;
   posting notice of shopping activities of the customer to members of an online social network of the customer, according to privacy information set by the customer;
   in response to receiving the customer call requesting assistance:
      determining whether at least one sales associate is available at a location at which the particular product item is currently in stock and available for purchase, and
      establishing call communication between the customer and an available sales associate at a merchant location at which the particular product item is currently in stock and available for purchase, based on information regarding current sales associate availability and the current product inventory information, if it is determined that at least one sales associate is available at a merchant location at which the particular product item is currently in stock and available for purchase; and
   providing access to information representative of customer purchase intent, wherein the inventory information is determined based upon a comparison of the inventory information and the purchase intent.

* * * * *